Jan. 18, 1927.　　　A. HERZ　　　1,614,672
PHOTOGRAPHIC PHOTOMETER
Original Filed Jan. 22, 1917　　　7 Sheets-Sheet 1
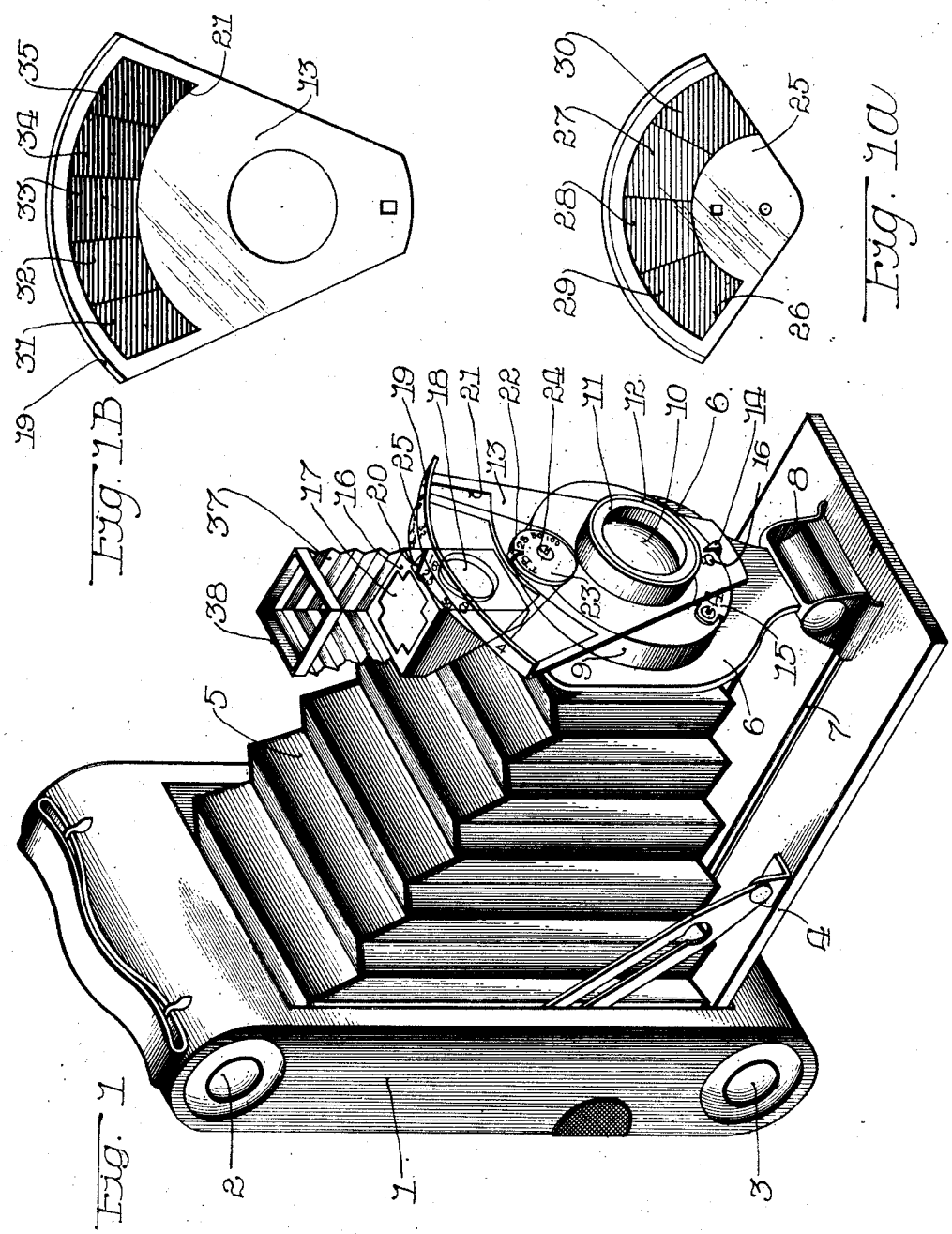
Inventor
Alfred Herz
By Brown, Hanson & Boettcher
Attorneys Jan. 18, 1927. 1,614,672
A. HERZ
PHOTOGRAPHIC PHOTOMETER
Original Filed Jan. 22, 1917    7 Sheets-Sheet 2

Inventor
Alfred Herz
By Brown, Hanson & Boettcher
Attorneys

Jan. 18, 1927.  1,614,672
A. HERZ
PHOTOGRAPHIC PHOTOMETER
Original Filed Jan. 22, 1917    7 Sheets-Sheet 3
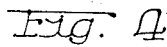
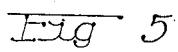
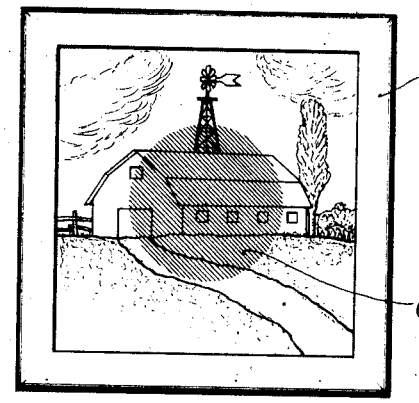
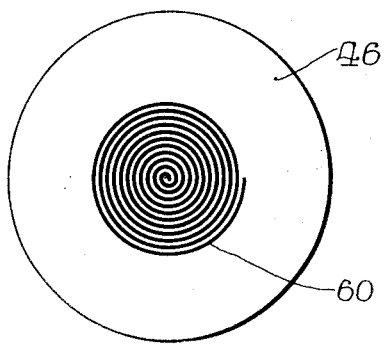
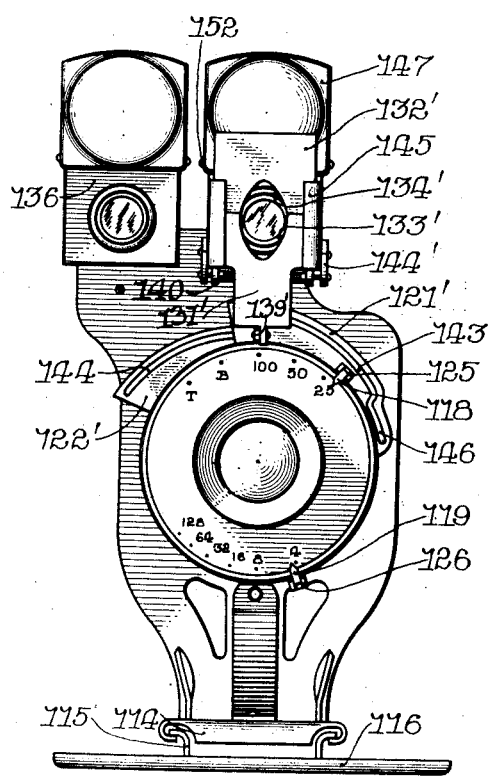
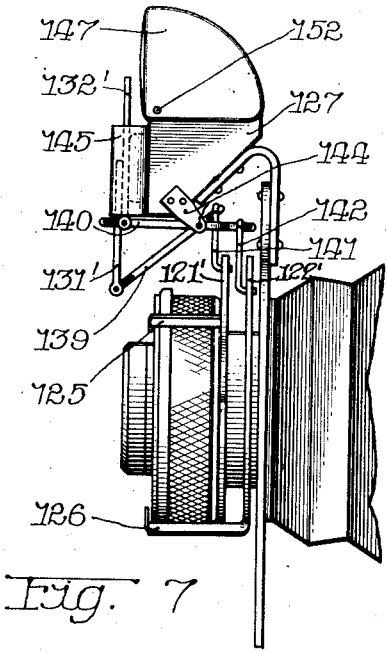
Inventor
Alfred Herz
By Brown, Hanson & Pretcher
Attorneys Jan. 18, 1927.
A. HERZ
1,614,672
PHOTOGRAPHIC PHOTOMETER.
Original Filed Jan. 22, 1917    7 Sheets-Sheet 4
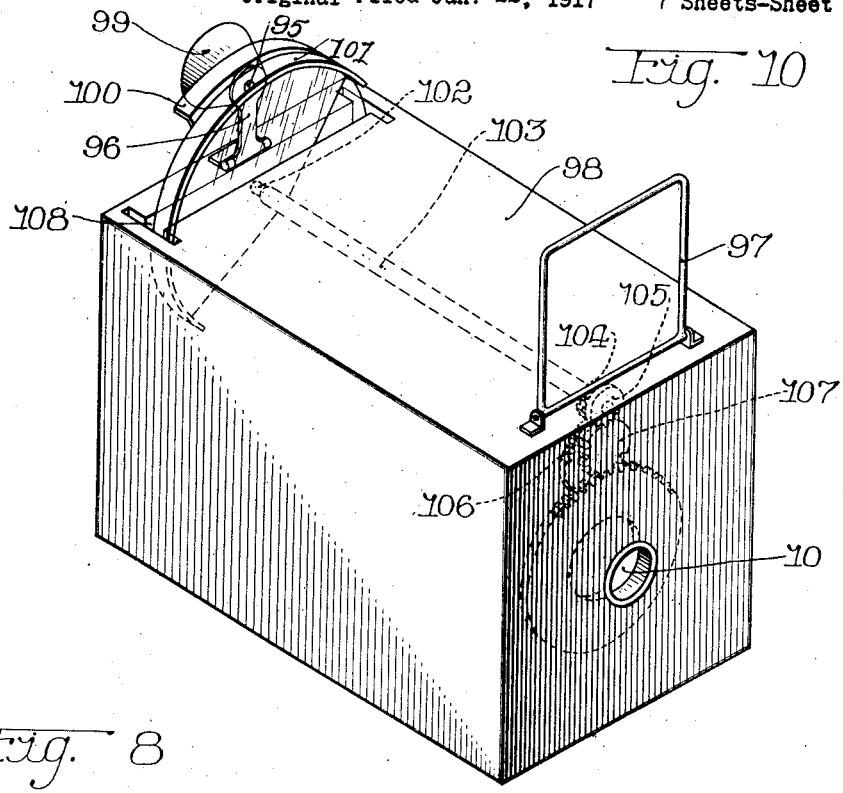
Fig. 10
Fig. 8
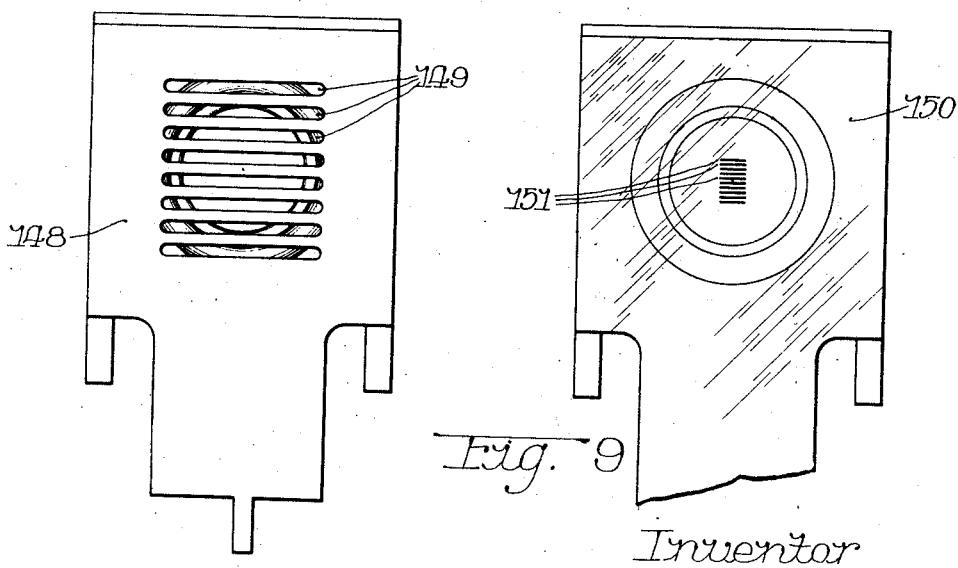
Fig. 9
Inventor
Alfred Herz
By Brown Hanson & Boucher
Attorneys

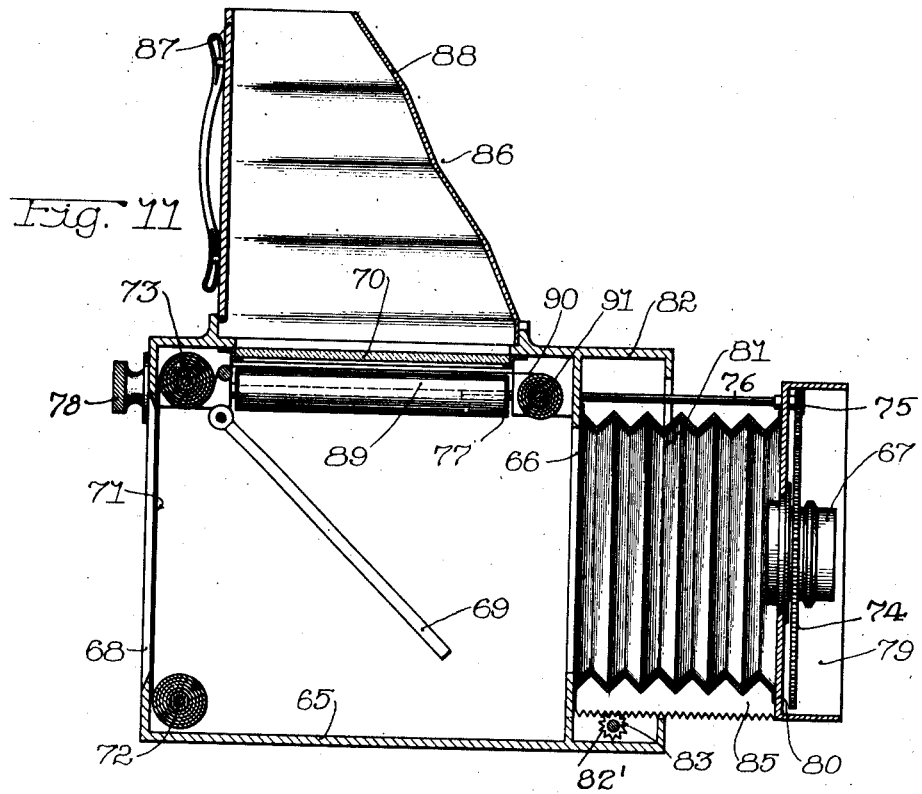
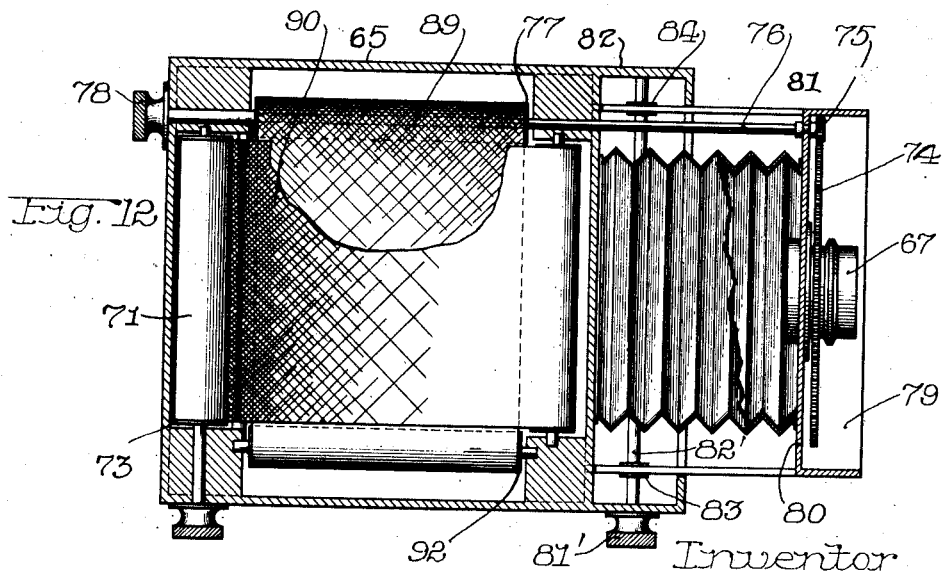

Jan. 18, 1927.
A. HERZ
1,614,672
PHOTOGRAPHIC PHOTOMETER
Original Filed Jan. 22, 1917     7 Sheets-Sheet 6
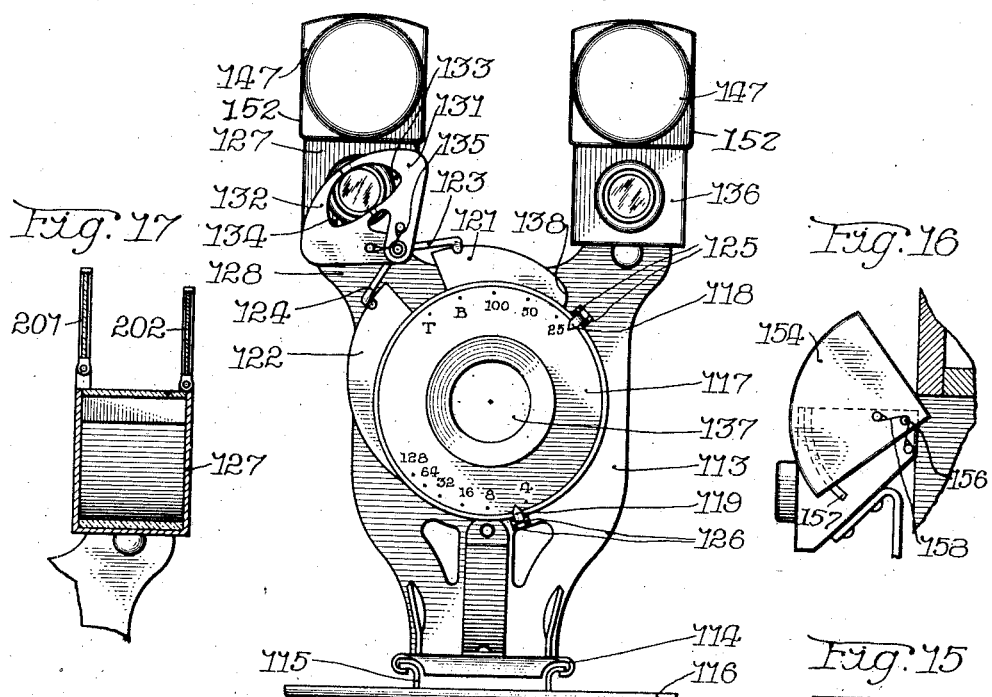
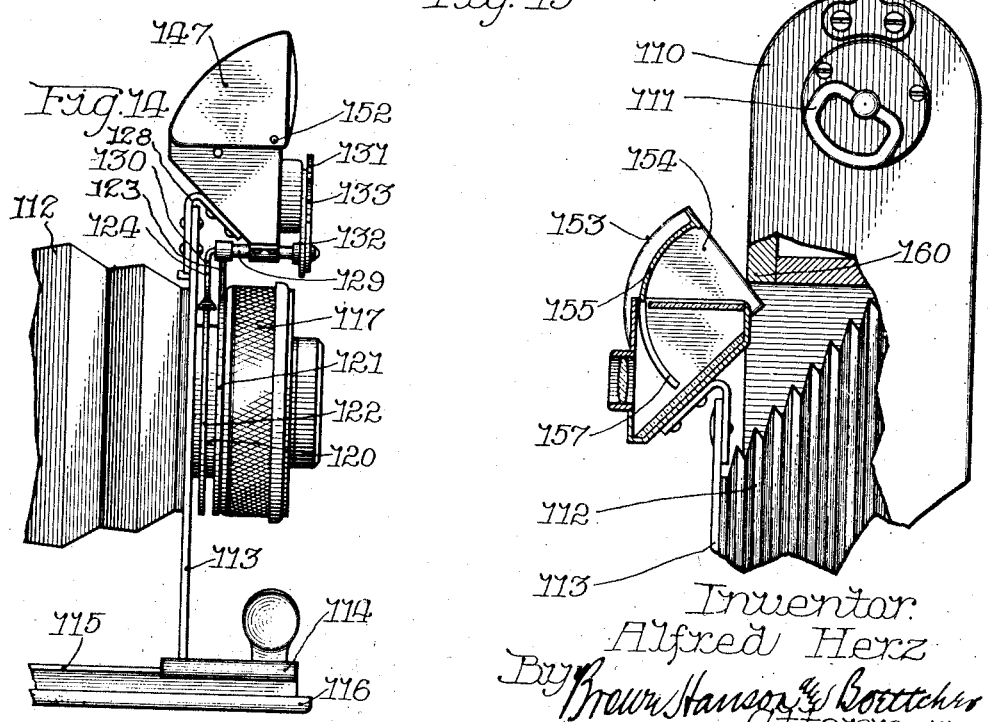
Inventor:
Alfred Herz
By Brown Hanson & Boettcher
Attorneys

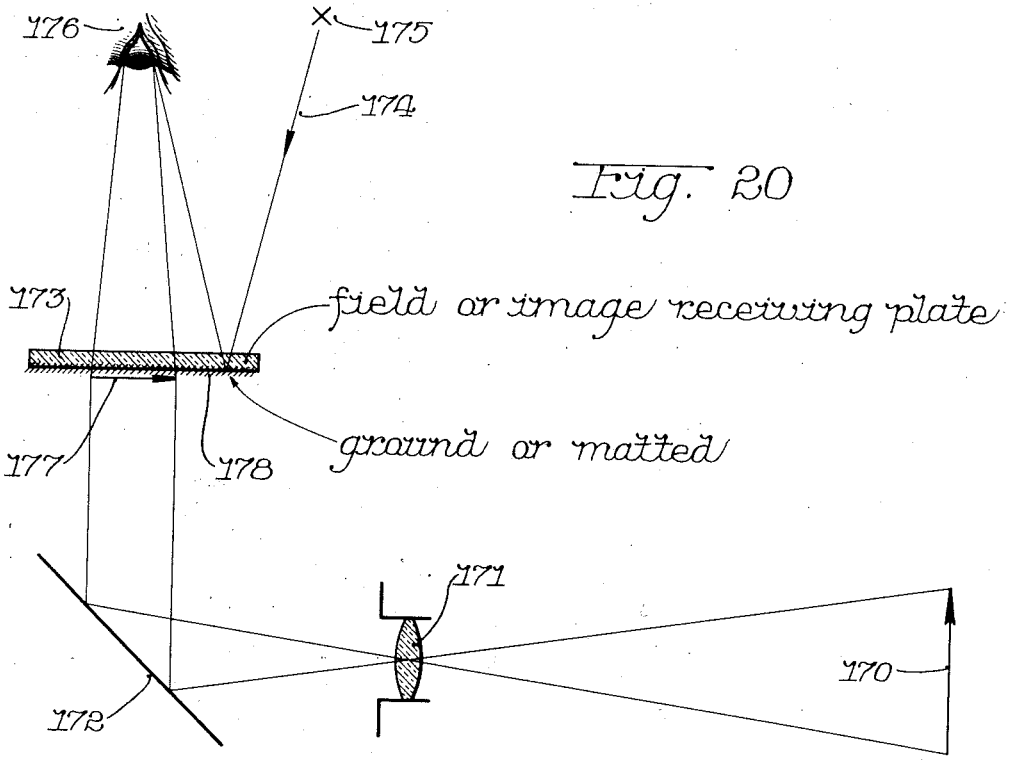
Fig. 20
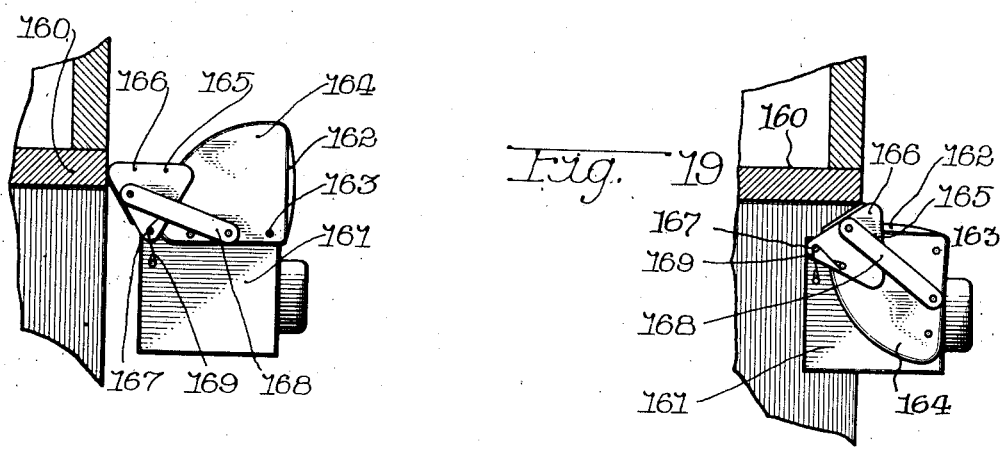
Fig. 19
Fig. 18
Inventor
Alfred Herz

Patented Jan. 18, 1927.

1,614,672

UNITED STATES PATENT OFFICE.

ALFRED HERZ, OF CHICAGO, ILLINOIS.

PHOTOGRAPHIC PHOTOMETER.

Application filed January 22, 1917, Serial No. 143,613. Renewed July 28, 1923.

My invention relates to photographic devices.

In United States Patent No. 1,213,485, issued to me January 23rd, 1917; I have described broadly a novel method of and apparatus for obtaining a measure of the light value of an object and for simultaneously causing the exposure of the sensitized plate to be made in accordance with the result or measurement so obtained.

My present invention relates to certain improvements upon the broad idea contained in my said patent. Among the specific objects of the present invention are the following:—

To provide an improved and simplified structure for carrying out and embodying the broad invention—

To provide an improved specific method of carrying out the general method set out in my said patent—

To provide an improved form of finder—

To provide an improved form of field or image-forming body for use in a finder or the like.

Other specific objects will be further apparent from the following description.

The manner in which I attain these and such other objects will be apparent from the following drawings which form a part of the present specification.

Figure 1 is an isometric view of a camera of a common type embodying my invention;

Figure 1ª is a view in elevation of one of the graduated light controlling plates;

Figure 1ᵇ is a similar view of a number of light controlling plates;

Figure 4 is a diagram illustrating the appearance of the finder field in the apparatus shown in Figures 2 and 3;

Figure 5 is a front elevational view of one of the style registering screens employed in the apparatus shown in Figures 2 and 3;

Figure 6 is a front elevational view of a modification employing sliding shutter applied to the typical structure of a well known manufacturer;

Figure 7 is a side elevational view of the apparatus shown in Figure 6;

Figure 8 is a modified form of shutter;

Figure 9 is a further modification of screen for effecting a part only of the field;

Figure 10 is an embodiment illustrating the manner of applying my invention to a box camera;

Figure 11 is a vertical longitudinal section of an embodiment illustrating the application of my invention to a camera of the reflecting type;

Figure 12 is a horizontal section of the same;

Figure 13 is a front elevational view of an embodiment illustrating a modified form of connection employing the same type of camera as is shown in Figures 6 and 7;

Figure 14 is a fragmentary side elevational view of the same;

Figure 15 is a cross sectional view of a finder employing a folding shield;

Figure 16 is a side elevational view of the same;

Figure 17 is a cross sectional view of the finder employing a separate screen for different plate speeds;

Figure 18 is a side elevation of a folding shield for the finder;

Figure 19 is a similar view of the same showing the shield in the operation of automatically folding; and Figure 20 is a diagram showing the use of my improved field plate.

Figure 3:
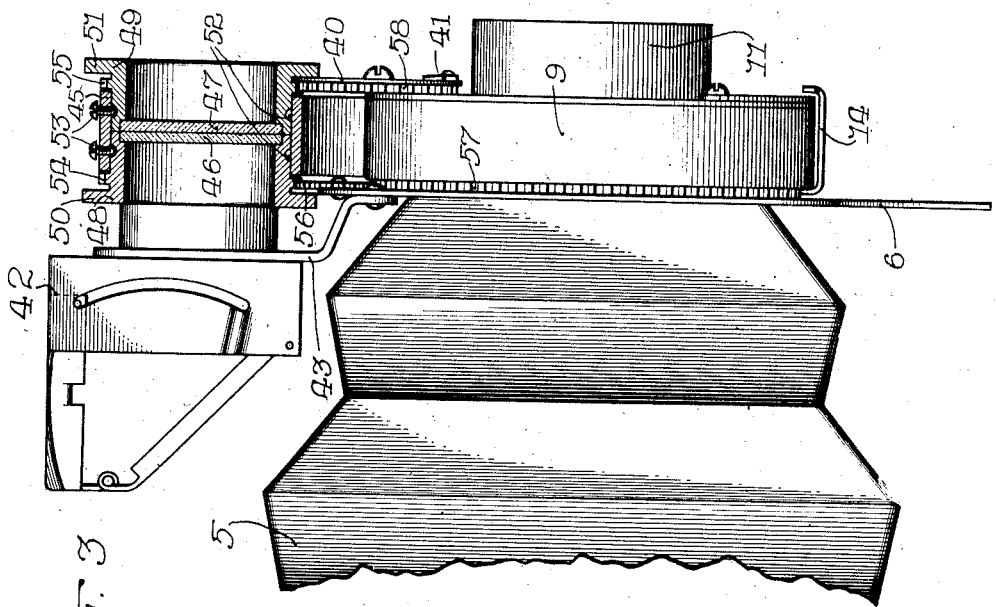
Figure 3 is a vertical cross section of the device shown in Figure 2.

As is explained in my prior patent, it is desirable particularly in cameras of the type employing films in the roll or any kind of sensitized plates which are to be developed rapidly and with a minimum of expense to have each exposure of about the same light value as the other exposures so that the development and printing of the plate may approach uniformity.

In order to produce this desirable result, it is necessary that the operator have some means for setting the stop mechanism and the timing mechanism to such values, as will secure proper exposure of the sensitized plate to secure the desired effect. A further advantage of the invention is to apprise the operator in advance of the fact that a proper exposure can or cannot be made.

In my prior patent, I have described means for obtaining a measurement or evaluation of the light given out by an object particularly by comparison with a standard of illumination and have illustrated and described the standard of illumination in that case to be a field or surface giving off a certain amount of light. The specific embodiments of the present invention permit of the desired operation by cutting off the light to such an extent as to cause the image to disappear. In other words, by comparison with zero illumination.

In the form of device shown in Figure 1 my invention is applied to a camera of the folding type. The camera comprises the main body 1 having a removable back not shown and film holding spools mounted upon the supports 2 and 3.

The rollers which support the film are provided with means for feeding successive sections of the film forward. The film in this case is the light sensitive element which I may term the "sensitized plate".

The main body of the camera is provided with a hinged cover 4 which forms a support for the folding bellows 5, the support plate 6 and connected parts. The hinged cover 4 is provided with a suitable track 7 upon which slides the supporting foot 8 of the plate 6. The supporting plate 6 bears the shutter box 9 which has in front the lens 10. This lens is mounted in a cylindrical extension 11 about which is screwed or clamped a retaining ring 12. A thin plate or sector 13 is provided with an aperture to permit it to be mounted upon the cylindrical boss 11 and this plate or sector is held in place by the ring or band 12. In practice I prefer to construct this plate of transparent celluloid. At its lower end the plate 13 is provided with an aperture for receiving the finger 14 which plays over a dial 15 mounted upon the face of the shutter box 9. The finger 14 is connected to the iris diaphragm which I term generally the stop controlling or illumination controlling mechanism.

The upper end of the supporting plate 6 supports the finder 16 which is provided with a suitable field 17 preferably in the form of a lens in which the image appears. This type of finder is generally termed a "brilliant" finder. The finder is provided with a lens 18, the axis of which lens is parallel with the axis of the main lens 10. The plate 13 extends upwardly and is provided with a flange 19 at its upper end, this flange bearing suitable indicia which, when brought before the pointer 20, indicate the position of the controlling finger 14 which operates the stop mechanism. Below the flange 19 the plate 13 is cut away, as is shown at 21, and a screen consisting of plates of different density is placed in the aperture in such position and relation that a screen of the lightest density will appear in front of the lens 18 of the finder 16 when the stop opening is wide open and a screen of maximum density will appear before the lens of the finder when the stop opening is substantially closed. The steps between are graduated in accordance with the size of the stop opening to which they correspond. In this connection the term "density" is employed as meaning ability to screen off the light entering the finder. In practice I have employed screens of gelatine clamped between thin sheets of mica, these screens of gelatine being colored blue with the proper quantities of coloring matter. I do not wish to be limited to gelatine screens nor to employing blue as a screening material as it is obvious that other means may be employed for shutting off greater or less amounts of the light passing through the screen.

The shutter box 9 is provided with shutter timing mechanism for controlling the length of time that the shutter is opened for the admission of light. This mechanism is well understood in the art and is not described in detail. The controlling mechanism for the shutter is connected to a finger 22 which plays over a dial 23 indicating the amount of time that the shutter opens to admit light. A screw 24 serves as a pivot for a smaller plate or sector 25, this sector being connected to the finger 22 that controls the time of shutter opening. The plate 25 is apertured at 26 for a portion of its width and screens 27, 28 and 29 of decreasing density respectively are mounted in the aperture in front of the lens 18 of the finder 16. A portion 30 of the plate 25 is adapted to be brought in front of the lens 18 when the shutter mechanism is set for a time exposure or for manual opening and control of the shutter.

The portion 30 is opaque and is adapted to shut off the light completely and thus warn the operator that the exposure is beyond automatic control and must be judged by the operator.

The screens 31, 32, 33, 34 and 35 in the plate 13 are of progressively increasing density in accordance with the size of the stop opening, as above explained. The finder 16 is provided with a folding hood or screen 37 which consists of a collapsible fabric bound at its upper end by a rectangular frame 38 of sheet metal or the like. This hood or screen aids the operator in forming and measuring the image without interference from external sources of light.

The operation of this device is as follows: When the camera is unfolded as is shown in Figure 1 and focused for the desired subject, an image of the subject is formed through the lens or field 17 and may be viewed through the hood 37. If the speed of the object to be photographed is so great as to require a definite speed of shutter operation, the shutter timing mechanism is set to the required speed of operation whereby a certain density of screen either 27, 28 or 29, will be brought in front of the lens 18. If an image appears upon the field 17 the operator then knows that a proper exposure can be obtained. In order to bring the adjustment to the best position, the plate 13 is then adjusted by moving the same back and forth to open or close the stop opening to such an extent as to block out the distinctive lines of the subject appearing in the image. When the stop opening has been brought to this value the adjustments are correct for forming a proper exposure.

If a greater time of exposure is permitted by the nature of the subject, the plate 25 is moved so that the pointer 22 rests, say upon the indication for one-twenty-fifth of a second. In this position the screen 27 which is of the least opacity is in front of the lens 18 and for this setting of the shutter mechanism a smaller stop opening may be employed so that a better definition of the image appears upon the sensitized plate as it is well known that the definiteness of the image tends to disappear with the greater stop opening.

The mechanism which I have employed to embody my invention permits of the construction of a camera which is capable of being folded up in the usual manner without the loss of any of the functions of the camera without such invention embodied. The necessary elements may be formed as an attachment to the camera and may be applied very easily without interfering with or causing any alteration in the regular structure.

Figure 2:
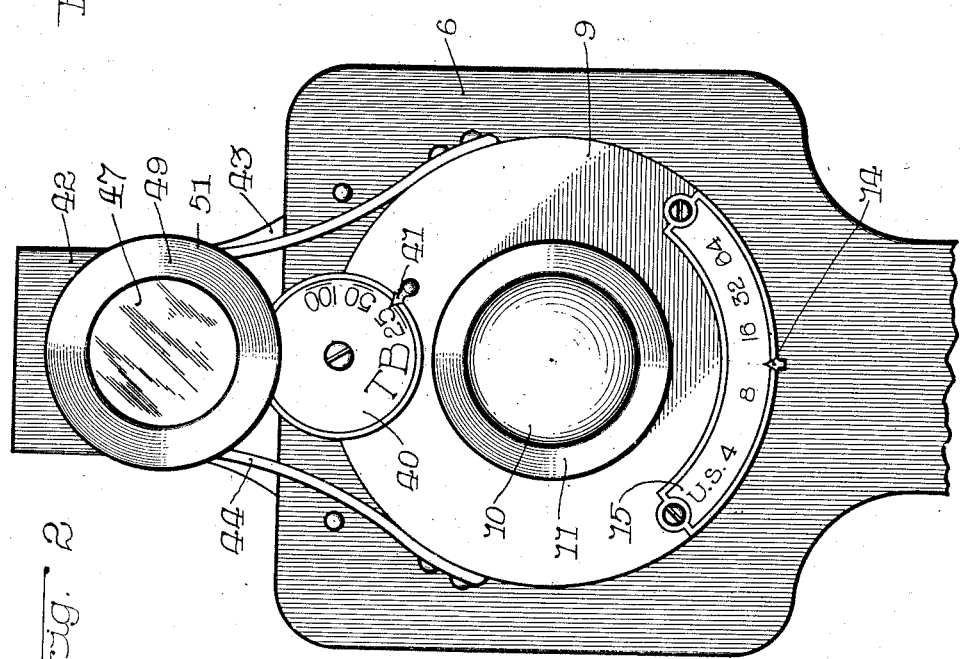
Figure 2 is a fragmentary front elevational view of a modification employing the style screen shown in Figure 5.

In Figures 2, 3, 4 and 5, I have shown another embodiment of my invention employing as a ground work or basis the type of camera shown in Figure 1. In this modification the shutter box 9 is mounted upon and supported by the plate 6 being provided with a finger 14 for controlling the iris diaphragm or stop mechanism and being provided with a rotatable disc 40 controlling the shutter mechanism. An indicating pointer 41 co-operates with the disc 40 to indicate the time of shutter opening. A finder 42 of the type previously described is mounted by a supplemental plate 43 upon the main supporting plate 6. A supporting frame 44 mounted on the shutter box 9 supports an annular ring 45 in which are placed two transparent plates 46 and 47 in close proximity to each other. These plates are mounted in annular thimbles 48 and 49 provided with flanges 50 and 51 by which they may be rotated in the ring 45. Suitable grooves 52 being formed in the peripheries of the annular thimbles and pins such as the screws 53 projecting into said grooves to hold the annular thimbles 48 and 49 in place. The thimbles are provided with gears 54 and 55 respectively, the gear 54 meshing by means of an idler 56 with a gear or gear sector 57 that is connected to the iris diaphragm or stop controlling mechanism. The gear teeth 55 mesh with a small gear 58 mounted concentrically with the disc 40 and controlling the shutter mechanism.

The transparent plates 46 and 47 are circular in outline and are held within the thimbles 48 and 49. These plates have at their center, placed by means of a photographic process or otherwise, spiral lines 60, these spirals 60 are so placed angularly with respect to each other that a maximum of light is permitted to pass through them when the shutter is set for the longest time of opening and the stop mechanism is set for maximum stop opening. When the spirals are rotated substantially 180° with respect to each other, the black line of one spiral will fill the space between the black lines of the other spiral so that substantially all of the light is cut off.

I have found that it is not necessary to make the width of the line as great as the distance between lines as the image will be substantially obliterated before opacity is secured. The spirals 60 do not cover the entire space of the discs 46 and 47, but are of such a diameter as to cover only the central parts of said discs so that upon the field of the finders 42 only the central part 61 of the image will be effected, as is shown in Figure 4.

In operation the thimbles 48 and 49 are rotated until the distinctive or characteristic lines of the critical part of the image disappear within the field affected by the spirals 60 and when this adjustment has been brought about the stop mechanism and the timing mechanism will be properly adjusted. In Figures 11 and 12 I have illustrated an embodiment in which my invention is applied to a camera of the reflecting type. In this type of camera a rigid box 65 is employed, this box being provided with a front opening at 66, in front of which is mounted the lens box 67 and an opening 68 is provided in the rear of the box, back of which opening the sensitized plate is supported. A hinged mirror 69 normally projects down into the box in such position that the light coming in through the lens box 67 is reflected upward and cast upon the field 70, this field comprising ground glass of the usual type or a special field of the type later to be described. A shutter 71 of the focal-plane type is arranged in front of the opening 68 in the rear of the box 65. This shutter comprises a narrow slit in the fabric of which the shutter is composed, this fabric being adapted to be rolled from one roller 72 to another roller 73 and vice versa. This rolling and unrolling of the shutter 71 is accomplished by spring mechanism not shown. The stop opening for the lens in the lens box 67 is controlled by a gear 74 mounted concentrically with the lens box 67 and connected by means of a pinion 75 and a shaft 76 to the roller 77 and to the setting knob or button 78. The lens box 67 is mounted upon a housing 79 having a back board 80 to which is secured the extensible bellows 81 connecting said back board with the front of the box. A housing 82 is adapted to shelter the lens box and housing 79 when the camera is folded up. The shaft 76 which may be square or provided with a suitable key way or the like, slides into and out of the roller 77 thus remaining in connection with the controlling knob 78. The housing 79 and lens box 67 are adapted to be extended or retracted by means of the knob or thumb wheel 81' connected to the shaft 82' and bearing the pinions 83 and 84 which mesh with suitable racks 85 for causing extension and retraction to secure the desired focus. The field 70 is surrounded by a hood 86 which is formed in part by a rigid cover 87 and in part by a leather or fabric 88 which is adapted to be folded together when the rigid cover or lid 87 is closed.

Immediately below the field 70 are placed a pair of transparent or semi-transparent curtains 89 and 90. These curtains are flexible and are adapted to be rolled back and forth upon suitable rollers, the curtain 90 being rolled upon the rollers 73 and 91 and the curtain 89 being adapted to be rolled back and forth upon the rollers 77 and 92. The curtain 89 is moved in connection with the setting of the stop controlling mechanism and presents increased difficulty to the passage of light as the stop opening is closed down.

The curtain 90 is connected to the shutter mechanism and presents greater difficulty to the passage of light as the shutter is set for a shorter time of exposure. The curtain 90 may be rolled upon the same roller as the focal plane shutter curtain 71 or may be rolled upon a separate roller connected therewith or controlled thereby. The roller 92 is constructed with spring means for playing out and taking up the curtain 89 as is required by the movement of a knob 78. It can now be seen that by suitably adjusting the stop controlling mechanism and the exposure timing mechanism the image on the field 70 may be brought to the desired degree of illumination where the important lines disappear and the camera is set for the proper exposure of the sensitized plate to light from the subject.

In Figure 10 I have shown an embodiment applying my invention to an inexpensive box type of camera. The image defining mechanism or finder in this case comprises a peep hole 95 formed in the hinged bracket 96 and the open frame 97 which is hinged to the top of the box or structure 98. The eye is placed behind the peep hole 95, the cup or flange 99 forming a shield for excluding undesirable rays of light. The subject to be photographed is viewed through the rectangular frame 97 in such manner as to define the image within the limit of said frame. A pair of sectors 100 and 101 revolving on concentric shafts 102 and 103 respectively, are connected by suitable gears shown in dotted lines at 104 and 105 respectively to the shutter controlling and stop controlling mechanism respectively. Suitable idlers 106 and 107 are interposed between the pinions 104 and 105 and the gears or gear sections which are connected to the shutter controlling and stop controlling mechanism respectively. Cameras of this type are generally of the universal focus type.

The transparent sectors 100 and 101 are provided with portions which pass in front of the peep hole 95 of graduated density such that when the image assumes a predetermined condition or quality of illumination, the shutter and stop controlling mechanism are properly adjusted. Due to the small area of the peep hole 95, it is practical to make these sectors of gradually increasing density, where such is desired, but I prefer to make these sectors of a form similar to that shown in Figures 1A and 1B where successive steps of density correspond to the successive settings of the stop and shutter respectively. Suitable indicia may be provided for indicating the setting similar to the indicia shown in Figures 1 and 2. I have found for the purpose of constructing an inexpensive camera that one adjustment may be relied upon entirely, as for instance, where the time of opening of the shutter is constant, the sector screen 101 which is connected to the iris diagrapham or the stop mechanism may be employed solely. The sector screens 100 and 101, when not in use, are pushed down into the slot 108 out of the way.

In Figures 13 to 16 inclusive, I have illustrated my invention as applied to and used in connection with another form of camera well known in the market.

This camera is of the folding type employing a box or container 110 which is provided at each end with means for holding a sensitized film, the thumb piece or handle 111 being employed to advance the film in the successive steps after each exposure. The folding bellows 112, preferably of leather or fabric or the like, is connected at its front end to a supporting plate 113 and is fastened at the rear within the box 110.

The supporting plate 113 is mounted upon an adjustable foot 114 which slides upon the ways 115 mounted upon the hinged door 116 in a manner well known in the art.

The shutter box 117 is supported from the plate 113, this shutter box having the controlling fingers 118 and 119 for controlling the duration of shutter opening and the area of stop opening respectively. A collar 120 connects the shutter box 117 with the supporting plate 113. Upon this collar I mount a pair of cam plates 121 and 122 respectively, these cam plates having portions encircling the collar 120 and having dwells or cam surfaces engaging tappet arms 123 and 124 respectively. The cam 121 is connected by means of the fingers 125 to the controlling finger 118 of the shutter controlling mechanism and the cam 122 is connected by means of the fingers 126 to the stop or diaphragm controlling mechanism. A finder 127 of a type later to be described, or of any preferred type, is mounted upon one extending ear 128 of the plate 113 and a pair of concentric shafts 129 and 130 are connected to the tappet arms 123 and 124 respectively. These concentric shafts carry at their outer extremities, the light obstructing members 131 and 132 respectively, said members consisting of plates having notches 133 and 134 respectively adapted to cut off the light gradually from in front of the finder 127, these plates or light obstructing members being movable relatively to each other. A spring 135 tends to hold the tappet arms 123 and 124 upon their respective cam members. In this modification I employ a separate finder 136 as an additional means for defining an image of the subject to be photographed. It is thus possible to employ the camera with its usual functions in connection with the finder 136 and it is possible to employ the novel function provided by my invention with a greater certainty as the eye can glance from one finder to the other and thus compare the images for the purpose of arriving at the proper setting of the instrument.

The lens 137 is mounted concentrically with the cylindrical collar 120.

In Figures 6 and 7 I have shown another manner of connecting the light obstructing members to the shutter controlling mechanism and the stop controlling mechanism. In this case the light obstructing members 131' and 132' are adapted to slide with a rectilinear motion over each other, these members being connected by rocking levers 139 and 140 respectively to the cam plates 121' and 122'. The rocking levers are provided with links 141 and 142 respectively, these links being provided with bent ends lying within the slots 143 and 144 formed in the cam plates 121' and 122' respectively. The rocking arms 139 and 140 rock on a horizontal pivot 144' secured below the body of the finder 127. The light obstructing members 131' and 132' are adapted to slide vertically in the ways 145 in front of the finder.

It will be noted in Figure 13 that the cam plate 121 is constructed with a sharp change of the cam surface at the point indicated at 138 by which the controlling finger 118 of the shutter control mechanism is moved from the instantaneous values. The purpose of this is to cause the light obstructing member 132' to come before the finder and thus obstruct completely the passage of light thereby indicating to the operator that the automatic setting function is not available for an exposure to be made on instantaneous values.

In the forms shown in Figures 6 and 7, the slot 143 is provided with a portion 146 performing the same function as above pointed out.

Instead of employing light obstructing members of the form shown in Figures 6 and 13 in which the single opening is gradually closed over a fairly wide range of movement, I employ a grading form of slide or obstructing member comprising two similar slides 148 Figure 8 (only one of which is illustrated) having a plurality of openings 149 in front of the finder or image-defining mechanism. With this type of light obstructing mechanism, a small movement is sufficient to change from maximum to minimum light transmission or vice versa.

Where it is desired to affect the light on a portion only of the field, a light obstructing device such as is shown at 150 in Figure 9, may be employed. This comprises a pair of similar transparent plates (only one being illustrated) having a plurality of fine parallel lines 151 mounted thereupon, such lines appear upon each of the pair of cooperating plates. For maximum light admission the lines upon the two plates coincide and for minimum light admission the lines on one plate coincide with the spaces between lines upon the other plate, as is readily understood in connection with the explanation set out for Figures 2, 3, 4 and 5.

In order to permit full advantage to be gained of my invention, I have found it desirable to screen off undesirable and extraneous light from the field of the image-defining mechanism that I employ. In the embodiments shown in Figures 6 and 13, I have employed a pivoted screen member 147 pivoted on pins 152 at a front edge of the finder. With this type of apparatus it is necessary in each case to push the shield 147 down before the camera can be folded.

I have devised a folding shield to facilitate the operation of folding up the camera, this shield being automatically folded down as the supporting plate 113 is moved back into the box or closure 110. In the form shown in Figures 15 and 16 I employ a shield 153 having side plates in the shape of sectors 154 and a front plate in the shape of a cylindrical surface 155, the shield being pivoted at its rear at 156, as is shown in Figure 16. The cylindrical portion 155 moves down through a curved slot 157 when the device is folded up. A spring 158 normally holds the shield in extended position. It can be seen from Figure 15 that when the camera is folded the upper edge of the side plate 154 strikes the corner 160 of the box or enclosure 110 thus folding the shield down out of the way.

In Figure 17 I have shown the manner in which adjustment may be made for different degrees of sensitiveness of plates. For this purpose I provide evaluating screens such as 201 and 202 which are pivoted in relation to the field of the exposure metering finder 127, so that they may be superposed at will on the field plate of the finder in such position as to lie between the image receiving surface and the eye and thereby make the proper adjustment for the corresponding speed of plates employed.

In Figures 18 and 19 I have shown another form of folding shield for the finder. In this form of apparatus the finder 161 is provided with a shield 162 extending along the side and in front of the finder, being pivoted at 163. The sides 164 of the shield 162 do not reach completely along the sides of the finder 161 and are supplemented by the side pieces 165 of a supplemental shield 166 which extends for a short distance along the sides and completely along the rear edge of the finder 161. The sides 165 of the supplemental shield overlap the sides 164 of the main shield 162. The supplemental shield is pivoted at the rear at 167. The two shields are connected on each side by links 168, the proportions of the links and of the pivot points being such that when the camera is folded up and the finder 162 is moved inwardly the top of the supplemental shield 166 in striking the shoulder 160 upon the main box of the camera will fold the main shield 162 down into the position shown in Figure 19. A spring 169 tends to throw the shields 162 and 166 into extended position where they surround the upper edge of the finder thereby preventing effectively the entry of light to the field of the finder to a sufficient extent to form an effective shield.

In order to avoid still further the interference from incidental light rays, I have provided an improved form of image receiving plate to be employed instead of the usual plate employed as a field for the finder.

In Figure 20 I have illustrated diagrammatically the manner in which my invention is employed.

The object 170 in front of the lens 171 throws off rays of light which are directed by the lens 171 upon a suitable mirror 172 inclined at a suitable angle to throw the rays of light upon the field plate or image-receiving plate 173 which heretofore has consisted of ground clear glass. That is to say, this plate has heretofore been entirely constructed of a transparent plate of glass having one side or surface frosted or matted for the purpose of receiving the image formed by the lens 171. I have found that in employing such a field plate it is subject to interference from external light to such an extent that a shield is almost indispensable. Assume that a ray of light 174 coming from a source 175 falls upon the plate 173, it is broken up at the frosted or matted surface of the field plate and the light therefrom is projected into the eye of the observer at 176, this amount of light being, particularly, when the sky overhead is bright, of such quantity as to interfere very seriously with the image 177 which appears upon the field plate. In order to correct for external and extraneous light, I have changed the character of the field plate 173 in the following particular, namely, I have provided the same with a material which shuts off to a certain extent the passage of light therethrough. The ray of light 174, before it can reach the eye 176, is then compelled to pass twice through this light obstructing medium which is embodied in the plate 173, and is thus subjected twice to an obstruction while the light coming from the subject 170 is subjected to this obstruction but once. Experiments with this type of field plate or image receiving plate shows that the same is very little affected regardless of the type of overhead light.

I have employed for this purpose thin plates of gelatine, celluloid, glass and the like containing a suitable dye or color, the lower surface being ground or matted as indicated at 178, to form the actual image-receiving surface, and the plate or film above forming a supporting means for the surface, and forming also obstructing means for obstructing external light such as that illustrated by the ray 174 in Figure 20. The dye or color which forms the light obstructing means may be evenly distributed throughout the body of the plate or may be contained in a layer. The image forming surface may be formed otherwise than by matting, grinding or frosting the surface, as for instance by adding a thin layer of material suitable for making the image apparent. I consider this form of field plate or image receiving plate to be broadly new.

I do not intend to be limited to the precise details of construction shown and described.

I claim:

1. In combination, a supporting plate, a shutter box mounted on said plate, a shutter timing mechanism and a stop opening controlling element for said shutter box, an image forming finder mounted on said plate, said finder having a field for defining an image, illumination controlling means for varying the amount of light in said field, and means connecting last said means with said shutter timing mechanism and said stop opening controlling element.

2. In a camera, a supporting plate, a finder mounted on said plate, a circular shutter box mounted on said plate, said shutter box having a circular portion concentric with the lens of said shutter box, stop controlling mechanism in said shutter box, said mechanism having a finger revoluble about said circular portion, illumination controlling mechanism for said finder, and means revoluble on said circular portion connecting said finger with said illumination controlling mechanism.

3. In combination, a supporting plate, a finder mounted on said plate, a circular shutter box mounted on said plate, said shutter box having a lens, said shutter box having a circular portion concentric with the lens, stop controlling mechanism in said shutter box, said mechanism having a finger revoluble about said circular portion, a plate having an aperture fitting over said circular portion and connected to said finger, illumination controlling mechanism for said finder, said plate being revoluble to control said illumination controlling mechanism.

4. In a camera, a supporting plate, a circular shutter box supported by said plate, said shutter box having a circular portion connected thereto, said portion being of less diameter than the shutter box, a lens concentric with said circular portion, a plate having an aperture therethrough, said aperture fitting over said circular portion, a finder mounted on said supporting plate, illumination controlling mechanism for controlling the amount of light admitted to said finder, said illumination controlling mechanism being operatively connected to said plate, and stop controlling mechanism for the main lens connected to said plate and movable therewith.

5. In combination, a supporting plate, a circular shutter box secured to said plate, a circular boss projecting from the front of said shutter box, stop controlling mechanism in said shutter box, said mechanism having a projecting finger movable about the periphery of said circular shutter box, a plate having an aperture fitting over said circular boss, means for holding said plate on said boss, said plate being connected to said finger, a finder mounted on said supporting plate and illumination controlling mechanism carried by said plate in front of said finder for controlling the amount of light admitted to said finder in accordance with the setting of the stop mechanism for the main lens.

6. In combination, a circular shutter box, having a main lens, a supporting plate for supporting said shutter box, a controlling finger projecting from said shutter box, shutter timing mechanism connected to said controlling finger, an oscillating plate connected to said controlling finger, a finder mounted on said supporting plate, and illumination controlling mechanism for said finder, said illumination controlling mechanism being controlled by the movement of the oscillating plate to change the amount of light admitted to the finder in accordance with the speed of operation of the shutter mechanism.

7. An attachment for a camera having a finder comprising a plate having a central aperture adapted to fit over a circular part of the camera and having an opening for engaging a controlling finger of the camera, and a plurality of screens of different density with respect to the transmission of light, said screens being so spaced with respect to the central aperture as to come in front of the finder.

8. As an attachment for a camera, a plate of substantially sector shape provided with an aperture, said aperture being adapted to fit over a pivot, said plate being provided with a second aperture and screens having different light densities mounted in said aperture.

9. In combination a supporting plate, a circular shutter box supported on said plate, controlling means mounted concentric with said shutter box and revoluble thereupon, a finder mounted on said supporting plate and a light obstructing element adapted to be movable with said controlling element to vary the amount of light entering said finder in accordance with the setting of said controlling element.

10. In combination a main camera having stop controlling mechanism and shutter timing mechanism, a finder, a pair of plates, one of said plates being connected to said stop controlling mechanism, the other plate being connected to said shutter timing mechanism, said plates extending to said finder and having light obstructing means adapted to shut off to a greater or less extent in accordance with the setting of the stop controlling mechanism and the shutter speed controlling mechanism, the light from said finder.

11. In combination a main camera having a lens, stop controlling mechanism and shutter timing mechanism, a finder, movable plates connected to said stop controlling mechanism, and said shutter timing mechanism respectively, said plates being organized to obstruct the light falling upon the field of said finder in accordance with the setting of said stop controlling mechanism and said shutter timing mechanism.

12. In combination, a main camera having a stop controlling mechanism, a finder, a plate having light obstructing means connected to said stop controlling mechanism, said plate being adapted to shut off the light falling upon the field of the finder in accordance with the setting of said stop controlling mechanism.

13. The method of securing proper light exposure from a subject upon a sensitized plate which consists in forming a luminous image of the subject, then modifying the luminosity of the image to the point of causing the characteristic details to become obliterated, and conjointly therewith controlling the length of time that light from the subject falls upon the plate.

14. The method of securing proper light exposure from a subject upon a sensitized plate which consists in forming a luminous image of the subject, then modifying the luminosity of the image to the point of causing the characteristic details to become obliterated, and conjointly therewith controlling the quantity of light from the subject falling on the plate.

15. In combination image forming means having a surface adapted to receive and make apparent an image from a lens, means presenting different degrees of difficulty to the passage of light and indicating means controlled by said latter means for indicating the degree of difficulty offered to the passage of light.

16. The combination with a photographic view finder having a lens, of a plate having provision for the transmission of light therethrough at different portions thereof, said plate being rotatable on a fixed pivot to bring said portions successively into registration with the lens, certain of said portions being provided with light retarding means, different amounts of light being cut off in different portions, and a legend for each portion indicating the time of exposure.

17. The combination with a photographic view finder having a lens, of a plate having provision for the transmission of light therethrough at different portions thereof, said plate being rotatable on a fixed pivot to bring said portions successively into registration with the lens, certain of said portions being covered with light retarding plates, said plates being arranged to cut off different amounts of light for the different portions progressively, and a legend indicating the time of exposure disposed adjacent to each of said portions.

18. The combination with a camera having a view finder provided with a lens, of means disposed on the exterior of the view finder and movable with respect to the view finder, for cutting off predetermined amounts of light entering the view finder.

19. The combination with a photographic view finder having a lens, of a plate having provision for the transmission of light therethrough at different portions thereof, said plate being rotatable on a fixed pivot to bring said portions successively into registration with the lens, certain of said portions being provided with light retarding means, so that different amounts of light are cut off by different portions, thereby modifying the entire amount of light received on the field of the view finder, at will.

20. In combination, a plate having an opening for forming a pivot, a series of screens mounted on said plate, said screens having different degrees of light transmissibility, said plate being cut away in front of said screens to permit the screens to form the sole light hindering means over a given area and a finder having its lens lying in line with said cut away portion.

21. An attachment for a camera, a plate having a generally sector shape, said plate having an aperture, said aperture being adapted to fit over a pivot, said plate having a concentric aperture along its outer periphery and screens having different light densities mounted in said aperture.

22. In combination a photographic view finder having a lens, a plate having certain portions thereof cut away, light retarding means of different degrees of effectiveness mounted in said cutaway portions, said plate being mounted on a fixed pivot to bring said light retarding means successively in register with the finder lens, thereby modifying the entire amount of light received on the field of the view finder at will.

23. In combination a photographic view finder having a lens, a plate having certain portions thereof cut away, light retarding means of different degrees of effectiveness mounted in said cutaway portion, said plate being mounted on a fixed pivot to bring said light retarding means successively in register with the finder lens, thereby modifying the entire amount of light received on the field of the view finder at will, and a legend indicating the time of exposure disposed adjacent each light retarding means.

24. In a camera, an exposure determining device including a test diaphragm having leaves defining an opening, a main camera lens, a shutter for said lens, a main diaphragm for said lens and two controlling elements, one for controlling the size of the main diaphragm opening, and the other for controlling the speed of the shutter, the opening defined by leaves of the test diaphragm being subject to the joint control of said controlling elements.

25. A photographic camera having a ground glass, two controlling elements, a test diaphragm subject to the joint control of said controlling elements for determining the amount of light projected onto said ground glass, a main camera lens, and means also subject to the joint control of said two controlling elements for determining the amount of light projected through said lens.

26. A photographic camera having a shutter adjustable for speed, a diaphragm adjustable for opening, a ground glass, a test diaphragm adapted to control the amount of light projected onto the ground glass, and two manually operable controls, the test diaphragm being subject to the joint action of said controls and one of said controls being adapted to adjust the main camera shutter and the other being adapted to adjust the main camera diaphragm.

27. A photographic camera having a main camera shutter adjustable for speed, a main diaphragm adustable for size of opening, a ground glass and a test diaphragm adapted to control the amount of light projected onto the ground glass, said test diaphragm having leaves defining an opening and two independent manually operable controls, the opening defined by the leaves of the test diaphragm being subject to the joint action of said controls, and one of said controls being adapted to regulate the speed of the main camera shutter and the other being adapted to regulate the size of opening of the main camera diaphragm.

28. In a camera, an exposure determining device including a test diaphragm having opaque leaves, a main camera lens, a shutter for said lens, a main diaphragm for said lens, and two controlling elements, one for controlling the size of the main diaphragm opening, and the other for controlling the speed of the shutter, the opening defined by the leaves of the test diaphragm being subject to the joint control of said controlling elements.

29. In a camera, an exposure determining device including a test diaphragm having translucent leaves, a main camera lens, a shutter for said lens, a main diaphragm for said lens, and two controlling elements, one for controlling the size of the main diaphragm opening, and the other for controlling the speed of the shutter, the opening defined by the leaves of the test diaphragm being subject to the joint control of said controlling elements.

30. In combination, a main camera lens having a shutter timing control mechanism and a stop opening control mechanism, a finder having a light controlling mechanism governing the amount of light admitted to the finder, a manually operable element connected to said shutter timing control and to the light controlling mechanism of the finder and a separate manually operable element connected to said stop opening control mechanism and the light controlling mechanism of the finder.

In witness whereof, I hereunto subscribe my name this 20th day of January, A. D. 1917.

ALFRED HERZ.